United States Patent [19]

Boecker et al.

[11] Patent Number: 4,692,418
[45] Date of Patent: Sep. 8, 1987

[54] SINTERED SILICON CARBIDE/CARBON COMPOSITE CERAMIC BODY HAVING FINE MICROSTRUCTURE

[75] Inventors: Wolfgang D. G. Boecker; George I. Reini, both of Lewiston, N.Y.

[73] Assignee: STEMCOR Corporation, Cleveland, Ohio

[21] Appl. No.: 16,459

[22] Filed: Feb. 19, 1987

Related U.S. Application Data

[63] Continuation of Ser. No. 645,462, Aug. 29, 1984, abandoned.

[51] Int. Cl.$^4$ ............................................. C04B 35/56
[52] U.S. Cl. ........................................ 501/90; 501/88; 423/345
[58] Field of Search ..................... 501/88, 90; 423/345

[56] References Cited

U.S. PATENT DOCUMENTS

| | | | |
|---|---|---|---|
| 3,205,043 | 9/1965 | Taylor | 423/345 |
| 3,966,855 | 6/1976 | Hollenberg et al. | 501/88 X |
| 4,108,929 | 8/1978 | Prochazka et al. | 501/90 X |
| 4,230,497 | 10/1980 | Schwetz et al. | 501/90 X |
| 4,312,954 | 1/1982 | Coppola et al. | 501/90 |
| 4,346,049 | 8/1982 | Coppola et al. | 501/88 X |
| 4,525,461 | 6/1985 | Boecker et al. | 501/90 |

FOREIGN PATENT DOCUMENTS

| | | | |
|---|---|---|---|
| 57-100983 | 6/1982 | Japan | 501/90 |
| 58-130165 | 8/1983 | Japan | |
| 59-102872 | 6/1984 | Japan | |
| 61-43310 | 9/1986 | Japan | |

Primary Examiner—William R. Dixon, Jr.
Assistant Examiner—Steven Capella
Attorney, Agent, or Firm—D. M. Ronyak

[57] ABSTRACT

Sintered silicon carbide/carbon composite ceramic body having a homogeneous very fine grain microstructure with at least 50 percent of its silicon carbide grains having a size not exceeding about 5 microns and an aspect ratio less than about 3, with graphite grains having an average size not exceeding that of the silicon carbide grains uniformly dispersed throughout the matrix of silicon carbide and having a density of at least 75 percent of theoretical can be made by firing of an infiltrated, microporous shaped green body having prior to infiltration a density of at least about 45 percent of theoretical, the shaped green body being infiltrated with an organic material which can be coked at elevated temperatures to form carbon, a sintering aid selected from the group consisting of aluminum, beryllium or boron or compounds containing any one or more of these or a mixture of any of the foregoing elements or compounds, silicon carbide having a surface area of from about 5 to about 100 square meters/gram and, optionally, a temporary binder at a sintering temperature of from about 1900° C. to about 2300° C. in an inert atmosphere or vacuum. The process for making such pressureless-sintered composite bodies is relatively undemanding of exact temperature/time control during sintering. Certain embodiments of such composite sintered bodies may be electrical-discharge machined. Fully dense composite bodies exhibiting no open porosity may be formed.

19 Claims, 23 Drawing Figures

|—40μ—|

|———|
40μ

40μ

$\overline{40\mu}$

40μ

SINTERED SILICON CARBIDE/CARBON COMPOSITE CERAMIC BODY HAVING FINE MICROSTRUCTURE

This is a continuation of application Ser. No. 645,462, filed Aug. 29, 1984, now abandoned.

BACKGROUND OF THE INVENTION

This invention relates to a sintered silicon carbide/carbon composite ceramic body and a process for making such a body. It particularly relates to pressureless-sintered, substantially homogeneous silicon carbide/carbon composite ceramic bodies, and more particularly, to those which have a very fine grain polycrystalline microstructure, and to a process for pressureless sintering of a composite ceramic body having a fine grain microstructure which process is relatively insensitive to sintering temperature and time in regard to the effect of these on the grain size or growth of grain. The microstructure of composites according to the invention is relatively unaffected upon subsequent exposure to the temperatures near to sintering temperature as compared to that of known pressureless sintered silicon carbide/carbon bodies.

The chemical and physical properties of silicon carbide make it an excellent material for high temperature structural applications. These desirable properties include good oxidation resistance and corrosion resistance, high heat transfer coefficient compared to metals and other ceramics, low expansion coefficient compared to metals, high resistance to thermal shock and high strength at elevated temperatures. Undesirable characteristics of known bodies of essentially pure silicon carbide, particularly those produced by known pressureless sintering processes, include inability to be electrical discharge machined at an acceptable rate, poor electrical conductivity, high sensitivity of microstructure to sintering conditions, growth of microstructure upon extended or repeated exposure to high temperatures, and a need to precisely estimate the amount of shrinkage which will occur upon sintering to avoid retooling if different dimensions than estimated result or are desired.

It is, therefore, believed desirable to enable the production of silicon carbide/carbon composite ceramic bodies having a density which is a high percentage of the theoretical density and suitable for engineering material uses, such as for example, high temperature applications involving relatively moving parts made to close dimensional tolerances. Silicon carbide has been identified as a preferred material for such applications (for example, refer to U.S. Pat. No. 4,312,954). Silicon carbide/carbon composite ceramic bodies according to the present invention may, in some instances, be even more advantageously employed than substantially pure silicon carbide bodies because these composite bodies in certain embodiments have a very fine grain microstructure that is easy to obtain on a repetitive basis because the shaped green body and process used in the manufacture of such composite bodies is relatively undemanding of exact temperature/time control during sintering. It is believed that certain embodiments will exhibit greater resistance to thermal shock and can withstand greater temperature differentials than known sintered silicon carbides. Some embodiments provide a self-lubricating characteristic which may be advantageously employed, for example, in mechanical seals. Other factors being equal, an ultrafine polycrystalline grain structure is desirable because it increases strength and resistance to mechanical impact loading, which properties depend upon the largest flaw present in a particular sintered ceramic body of a given material. The electrical conductivity of certain embodiments of the invention enables electrical discharge machining of these bodies as well as other electrical applications, e.g. high temperature heating elements for an inert atmosphere. This represents a significant advance in that sintered silicon carbide bodies previously were machined using expensive diamond tools which caused damage to the surface of the body being machined resulting in lower rupture resistance. The fracture toughness of certain embodiments exceeds that of known pressureless-sintered silicon carbide having a density that is a similar degree of theoretical density. Use of the process of the present invention provides lower shrinkage and/or a method to control shrinkage and porosity of sintered silicon carbide composites Composite bodies of silicon carbide/graphite have heretofore been produced by reaction bonding (also known as reaction sintering) and hot pressing. Reaction sintering involves use of silicon impregnants to upgrade the density of silicon carbide through reaction with excess carbon in the substrate. Reaction sintering is useful for many applications but is undesirable where excess silicon exuding from the silicon carbide body would be detrimental (e.g. high temperatures in excess of 1400° C.). Hot pressing (the production of high density silicon carbide/graphite composite ceramic bodies by simultaneous application of heat and pressure) is impractical for complex shapes because of complex mold design and high uniaxial pressure. The pressure required (typically of the order of greater than 1000 psig) deforms the body. Difficulty or impossibility may be encountered in removing the hot pressed part from its complex mold. As the mold configuration is increased in complexity it becomes more difficult or impossible to remove the hot pressed part.

Methods for producing composite bodies of silicon carbide/graphite are disclosed in many U.S. patents. U.S. Pat. No. 2,527,829 to Leitten et al discloses a method in which coarse particulate silicon carbide is mixed with flaked graphite and a binder which melts in the temperature range of 2000°–2300° F. This mixture is compacted into a briquette, held together by the binder. U.S. Pat. No. 2,907,972 to Schildhauer et al describes the production of a silicon carbide/silicon refractory by reaction sintering of silicon carbide/carbon with silicon. U.S. Pat. No. 4,019,913 to Weaver et al describes siliconizing of a silicon carbide/graphite mixture at a temperature greater than 2000° C. to convert the graphite into silicon carbide and results in a single phase silicon carbide body. U.S. Pat. No. 4,154,787 to W. G. Brown describes the production of a siliconized silicon carbide/carbon body particularly useful for seal rings containing free silicon which is produced by reaction bonding of a silicon carbide/carbon mixture by infiltration of silicon. U.S. Pat. Nos. 4,312,954; 4,124,667; 4,346,049; 4,179,299; 4,135,938; 4,172,109; 4,123,286; 4,135,937; 4,144,207; 4,207,226; 4,237,085 disclose silicon carbide compositions that may contain, in some instances, up to 5 percent carbon in the final sintered silicon carbide product and, in other instances, up to 6 percent uncombined carbon in the final sintered product. A body formed according to U.S. Pat. Nos. 4,135,937 and 4,135,938 may contain up to 15 percent additional carbon (beyond that in the original particulate silicon carbide) derived from graphite or carbonized organic composition. In U.S. Pat. No. 4,135,938 it is stated that it is believed that most of the additional carbon is chemically combined with the silicon carbide and additive compound (for example, BP, BN, or $AlB_2$).

U.S. Pat. No. 3,205,043 to Taylor discloses the manufacture of dense silicon carbide articles by forming a bonded or recrystallized porous body structure of granular silicon carbide of the desired shape whose pores are impregnated in one or more cycles with carbonizable material which is thereafter carbonized followed by heating of the carbon-impregnated body in a silicon-supplying environment to cause penetration of and reaction of the silicon with the carbon within the pores of the body to form additional carbon. This body is not, however, pressureless sintered and is commonly referred to as reaction-bonded silicon carbide.

Thus, none of these patents disclose a process for the production of a fine-grained pressureless-sintered silicon carbide/carbon composite ceramic body which process includes forming a preshaped microporous ceramic body of very fine particle size silicon carbide and thereafter infiltrating the green body with a carbon source resin. None of these patents disclose a pressureless-sintered silicon carbide/carbon composite having high electrical conductivity.

Thus, while U.S. Pat. Nos. 4,312,954 and 4,179,299 and 4,346,049 disclose a fine grained pressureless-sintered silicon carbide/carbon composite ceramic body, there remains a need/desire for a process that will reliably provide a pressureless-sintered silicon carbide/carbon composite body of even finer grain microstructure than heretofore readily attainable.

U.S. Pat. Nos. 4,179,299 and 4,346,049 teach the inherent advantages of and disclose a sintered alpha, non-cubic crystalline silicon carbide ceramic body having a predominately equiaxed microstructure; in other words, more than 50 percent of the microstructure is such that the ratio of the maximum dimension of the grains of the crystal microstructure to the minimum dimension of the grains of the crystal microstructure is less than 3 to 1. These patents may also be referred to for their teaching as to the effect on crystal size of sintering temperature and time in substantially pure silicon carbide bodies containing about 2 percent by weight of carbon. These references show that it is difficult to achieve the desired fine grain size, equiaxed microstructure unless close control of the process is maintained, particularly as regards the sintering temperature This same problem and goal in the manufacture of dense, shaped articles of alpha silicon carbide is addressed in U.S. Pat. No. 4,230,497 to Schwetz et al, who disclose use of an aluminum sintering aid to reduce the need to maintain an exact sintering temperature.

U.S. Pat. No. 3,165,864 to Schulze describes a hot-pressed silicon carbide/graphite composite body having an exposed surface of high modulus ceramic and an interior of low modulus formed substantially of graphite. The composition gradually changes from an outer layer of siliconized silicon carbide to a substantially pure graphite inner layer.

U.S. Pat. No. 4,108,675 to Tomita et al describes a refractory brick made by forming and subjecting to reducing-burning a composition comprising an acid or neutral refractory material (e.g. high $Al_2O_3$ or high $ZrO_2$ material) as a base material, 3–10 percent of graphite powder and a binder which may be a mixture of tar and pitch or a phenolic resin. The brick can contain 2–8 percent of finely crushed silicon carbide. The pores of the brick may be filled with carbon by impregnating the burnt composition with tar or pitch and thereafter reburning.

It is, therefore, an object of this invention to provide a sintered silicon carbide/carbon composite ceramic body having a continuous phase of sintered silicon carbide and an uncombined carbon phase of amorphous or crystalline type or mixtures thereof substantially homogeneously dispersed throughout the silicon carbide matrix. Some or most of the carbon may be in the form of graphite in the sintered composite body. "Uncombined" as used herein means not chemically combined, for example, as with silicon to form silicon carbide.

It is a further object of this invention to provide such a composite body from starting materials which may include alpha phase non-cubic crystalline silicon carbide, amorphous silicon carbide or beta silicon carbide. It is well known that the alpha phase silicon carbide is more thermodynamically stable than other forms and at this time is lower in cost. Alpha-phase non-cubic crystalline silicon carbide is also much more readily obtainable than either amorphous or beta cubic silicon carbide.

It is also an object of this invention to provide a process including pressureless sintering for the production of such sintered silicon carbide/carbon composite ceramic bodies having a fine grained polycrystalline microstructure and relatively high electrical conductivity when compared to previously publicly known pressureless-sintered silicon carbide bodies.

It is a further object of this invention to enable production of sintered silicon carbide/carbon composite bodies of different dimensions from the same mold by controlled infiltration of a carbon source organic material. The amount of shrinkage induced upon sintering is reduced by the presence of an increased amount of infiltrated carbon which is added prior to sintering. A body of greater dimension may be produced by infiltrating a greater amount of such an organic material.

In this abstract, specification and claims, unless otherwise indicated, all quantities, proportions and ratios are stated on a weight basis.

The term "microporous" and related forms, as used in this specification and appended abstract and claims, refers to a characteristic of the shaped object prior to completion of sintering and means that such shaped object has interconnected microporosity which enables infiltration by a fluid such as an organic resin.

SUMMARY OF THE INVENTION

According to a first aspect of the present invention there is provided a pressureless-sintered silicon carbide/carbon composite ceramic body consisting essentially of:
   a. silicon carbide;
   b. an effective amount of sintering aid;
   c. a total uncombined carbon content of from about 1.5 to about 25 percent by weight, with at least part of said carbon being derived from infiltration of an organic resin into a microporous shaped object;
   d. the composite body having a homogeneous fine grain microstructure of silicon carbide grains having carbon substantially uniformly dispersed throughout, the body having a density of at least 75 percent of theoretical based on the law of mixtures.

According to another aspect of the present invention, there is provided a process for producing a sintered silicon carbide/carbon composite ceramic body comprising the steps of:

a. forming a homogeneous mixture comprising the components of:
  (1) a carbon-containing additive selected from the group consisting of amorphous carbon, and a solvent soluble, organic material which can be coked at temperatures below about 1000° C. to form amorphous carbon or mixtures thereof, in an amount between 0.5 and 5 percent by weight of uncombined carbon;
  (2) from about 0.15 to about 15 percent by weight of a sintering aid selected from the group consisting of aluminum, beryllium or boron or compounds containing any one or more of these or a mixture of any of the foregoing elements or compounds, said sintering aid containing from about 0.15 to about 5 percent by weight of aluminum, boron or beryllium or a mixture of any of these;
  (3) up to 25 percent by weight of an organic temporary binder;
  (4) a balance of silicon carbide powder having a surface area of from about 5 to about 100 square meters per gram;
b. shaping the dry mixture in such a way as to produce a microporous shaped object having a density of at least about 45 percent of theoretical; and
c. infiltrating the shaped object with an organic material which can be coked at temperatures below sintering temperature to form amorphous carbon, in an amount between about 1 and 25 percent by weight of the shaped object;
d. firing the shaped object in the absence of any substantial externally applied pressure under such conditions of time and temperature in an atmosphere inert to silicon carbide or in a vacuum at a temperature of between about 1900° C. and 2300° C. until a sintered body having a homogeneous fine grain microstructure of silicon carbide grains having carbon substantially uniformly dispersed throughout, is formed According to another aspect of the present invention, there is provided a sintered silicon carbide/carbon composite ceramic body consisting essentially of:

a. from about 1 to about 47 percent by weight of graphitic carbon and having a total uncombined carbon content of from about 1.5 to about 49 percent by weight;
b. an effective amount of sintering aid;
c. the balance being silicon carbide;
d. the composite body having a homogeneous fine grain microstructure of silicon carbide grains and graphite grains with at least 50 percent of its silicon carbide grains on an area basis having a size not exceeding about 5 microns and an aspect ratio less than about 3, the body having a density of at least 75 percent of theoretical density based on the law of mixtures, said body produced by pressureless sintering, at a temperature of from about 1900° C. to about 2300° C., a microporous shaped object having a density before pressureless sintering of at least about 45 percent of theoretical, the shaped object comprising:
  i. from about 1 to about 47 percent by weight graphite having a surface area of at least about 5 sq. meters/gram and an average particle size not exceeding about 8 microns;
  ii. from about 0.67 to about 17 percent by weight of an organic solvent soluble, organic material, which can be coked to provide uncombined carbon said organic material having a carbon yield of from about 0.5 to about 5 percent by weight of the object;
  iii. from about 0.15 to about 15 percent by weight of a sintering aid selected from the group consisting of boron, aluminum and beryllium or compounds containing any one or more of these or a mixture of any of the foregoing elements or compounds, said sintering aid containing from about 0.15 to about 5 percent by weight of boron, aluminum or beryllium or a mixture of any of these;
  iv. from about 0 percent to about 25 percent by weight of temporary binder; and
  v. the balance being silicon carbide having a surface area of from about 5 to about 100 sq. meters/gram,
  vi. wherein the microporous shaped object is infiltrated with an organic material which can be coked at temperatures below sintering temperature to provide amorphous carbon in an amount between 1 and 25 percent by weight of the preshaped object.

DETAILED DESCRIPTION

Figure 1:
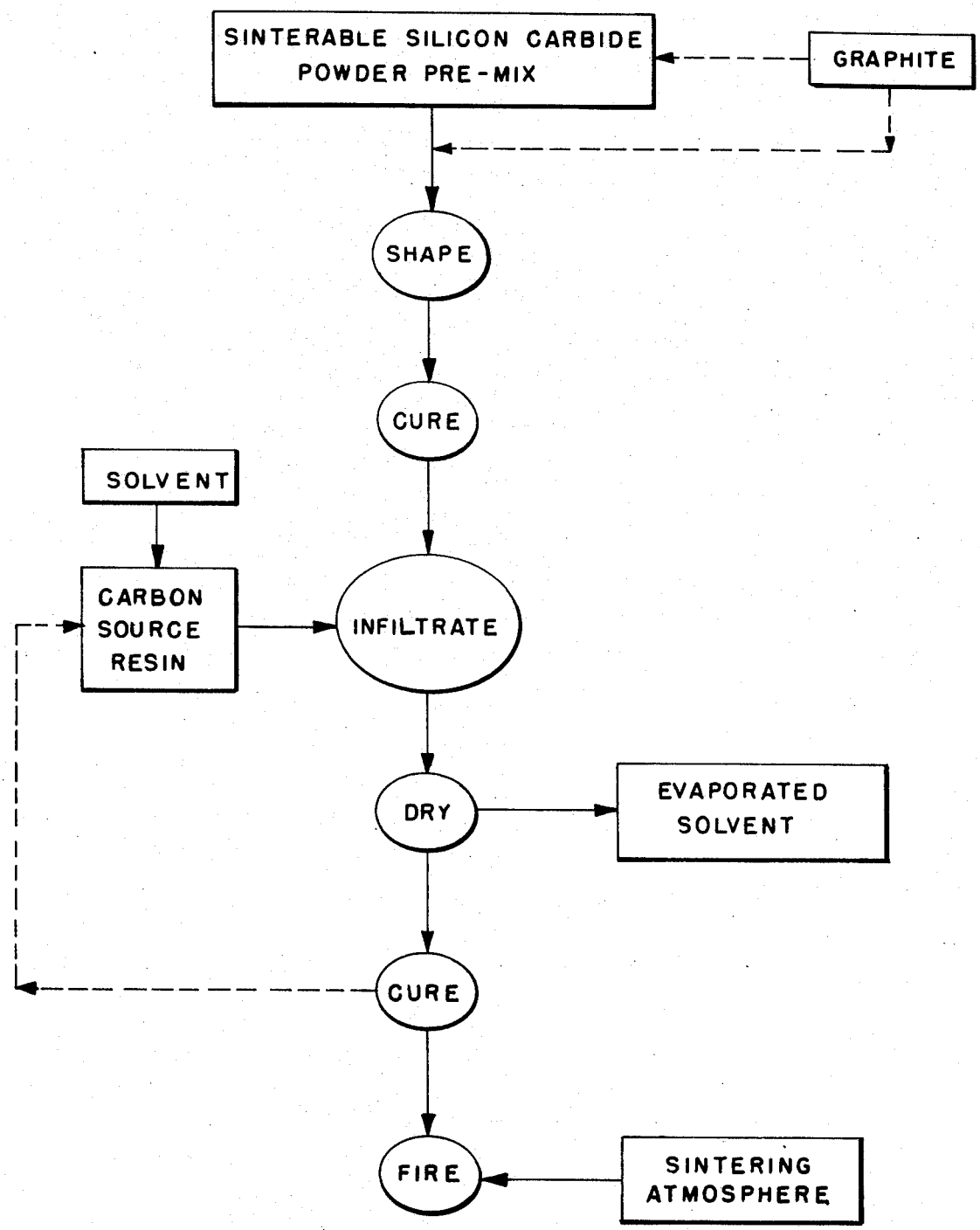
FIG. 1 of the drawing is a flow chart illustrating a preferred process embodiment according to the present invention for manufacture of sintered silicon carbide/carbon composite ceramic bodies of the present invention. Dashed lines depict variations of processes according to the present invention.
Figure 2:
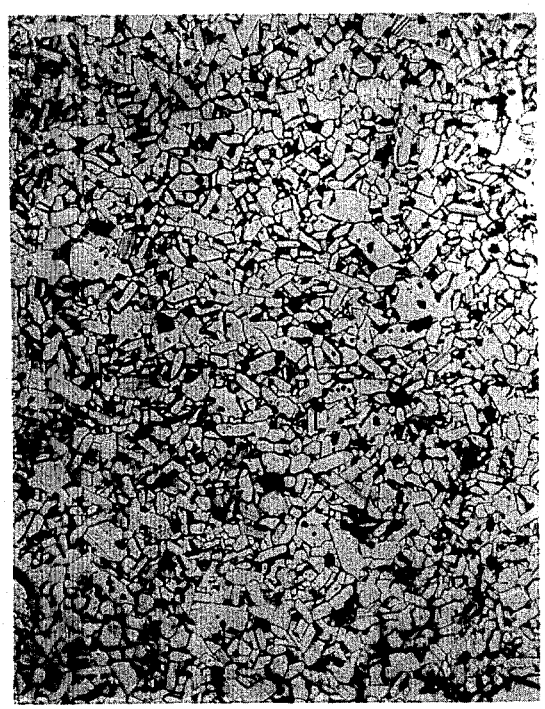
FIGS. 2, 4, 6, 8, 10–14, 16, 18, 20 and 22 show at a magnification of about 500 times, microstructures resulting from sintering in a tube furnace at 2150° C. for 30 minutes in argon of bodies having, by calculation and formulation, compositions as given in Table I.

The theoretical density of silicon carbide is 3.21 g/cc. Sintered SiC/c composite bodies according to the invention may have a density which is any percentage of theoretical density based on the law of mixtures. The preferred minimum density for sintered silicon carbide/carbon composite ceramic bodies according to the present invention corresponds to about 75 percent of theoretical density. More highly preferred for some applications is a density which corresponds to at least 80 percent of theoretical and for other applications a density which is at least 90 percent of theoretical. Higher density is generally desired where a low porosity and high modulus are desired. As used herein, the value of theoretical density, as it applies to a composite, is computed according to the law of mixtures which assumes that no solid solutions exist for purposes of the computation. To assure a proper understanding of the theoretical density as the term is employed herein, the following example is provided. The theoretical density of a composite comprising 3 percent graphite, 0.4 percent B4C, 2 percent uncombined carbon in a form other than graphite, and 94.6 percent silicon carbide is 3.140 g/cc. The theoretical density of carbon or graphite is 2.25 g/cc. The theoretical density for B4C is 2.51 g/cc; The theoretical density is the reciprocal of the sum of the volume fractions of the constituent components. Thus, for this example, it is 1 / (0.03 / 2.25 + 0.004 / 2.51 + 0.02 / 2.25 + 0.946 / 3.21) = 1 / (0.31852) = 3.140 g/cc. Similarly computed, the theoretical density for a composite comprising 8 weight percent graphite, 5 weight percent Be, 2 percent uncombined C in a form other than graphite and 85 percent silicon carbide is 2.97 g/cc.

1. Starting Components or Ingredients

A. Silicon Carbide Powder

The silicon carbide starting material can be obtained from any of a variety of sources. Vapor phase reactive material is produced in fine particle size and can be used if desired. Larger material can be ball milled until sufficient amounts of fine silicon carbide are obtained and the proper size of silicon carbide can be selected from the ball milled product by conventional means, such as water sedimentation.

The crystalline habit of the silicon carbide starting material is not believed to be critical. Alpha, non-cubic silicon carbide is more readily available than beta silicon carbide, lower in price and more thermodynamically stable and, therefore, the preferred starting material. It is acceptable, however, to use silicon carbide that has been made by a process which produces mixtures of alpha and beta silicon carbide and, thus, the next most preferred silicon carbide is that which is predominately alpha, non-cubic crystalline silicon carbide. It is also possible to utilize high purity beta silicon carbide powder but such material is not preferred because of its high expense in the requisite high purity form.

Preferably, the silicon carbide material is relatively free of materials such as silicon, silicon dioxide and other oxygen sources which may interfere with the sintering operation. To ensure this, the silicon carbide material may be treated prior to its use in processes according to the invention or the manufacture of articles according to the invention with acid (such as hydrofluoric and/or nitric acids, particularly mixtures of hydrofluoric and nitric acids) to remove extraneous materials such as silicon, silicon dioxide and other oxygen sources which may interfere with the sintering operation.

The silicon carbide powder must be of fine particle size. Suitable silicon carbide powders have maximum particle size of 8 microns or less, and preferably submicron size particles predominate. It is difficult, however, to obtain accurate particle size distributions for silicon carbide powders having a particle size of much less than 1 micron and the surface area of the silicon carbide particle is a more relevant characteristic in determining suitable material. Accordingly, the preferred silicon carbide particles for use in the process of the present invention to produce sintered composite ceramic bodies of the present invention are specified as having from about 5 to about 100 square meters/gram surface area. Within this range, it is more preferred that the surface area of the silicon carbide particles range between about 5 and 50 square meters/gram and within this range surface areas between about 7 and about 15 square meters/gram have been found to be easily obtainable and quite useful for producing sintered composite ceramic bodies of the present invention.

The silicon carbide powder may contain minor amounts of impurities such as graphite, aluminum, boron or free silicon without deleterious effect; generally, a purity of greater than about 95 percent is required and a higher purity, i.e. 97 percent or more, is desired. Acceptably pure and suitable silicon carbide powder is described in U.S. Pat. No. 4,123,286 to Coppola et al. Commercially available silicon carbide powder usually contains some uncombined carbon in the form of graphite, typically about one-half percent and up to 2 percent. The total graphite present should be adjusted accordingly to maintain the limits herein set forth. The amount of free silicon should be such that the raw batch does not contain more than about one percent of free silicon. The amount of free silicon can be higher as this will be converted in situ to SiC by the free carbon present. Thus the amount of free silicon must be taken into account when determining the amount of carbon desired in the composite.

The silicon carbide powder may be doped with a sintering aid prior to its use in the invention. In this event, the amount of sintering aid subsequently added is accordingly adjusted downward or altogether eliminated. Pre-doping of the silicon carbide powder may be accomplished by adding a sintering aid during formation of the silicon carbide powder. The silicon carbide powder may also be doped after its formation by heating in the presence of a sintering aid.

B. Graphite Powder

While graphite powder is an optional ingredient, it may be employed in combination with the rest of the present invention to provide pressureless-sintered silicon carbide/carbon composite bodies of varying density and porosity. Lower densities at a given porosity are practically obtainable when graphite powder is employed in combination with infiltration than when infiltration alone is used. The graphite starting material can be obtained from any of a variety of sources. Larger material can be ball milled until sufficient amounts of fine graphite powder are obtained and the proper size of graphite can be selected from the ball milled product by conventional means. A suitable graphite powder is known as Dixon Airspun Graphite available from Joseph Dixon Crucible Company of Jersey City, N.J. This product may be further reduced in particle size by processing it in a vibro-energy mill such as that available from SWECO for four hours using silicon carbide media in heptane. An especially preferred graphite is available from Lonza Incorporated, Fairlawn, N.J. under the name Lonza graphite grade KS 2.5. This powder has an average available particle size of about 2.5 microns and a specific surface area exceeding about 20 square meters/gram as determined by using nitrogen at 77° K. as the adsorbate. Its hydrophyllic (that is, easily wet with water when compared to other available graphite powders) nature facilitates processing. Suitable graphite powders have an average particle size not in excess of 8 microns, preferably not in excess of 5 microns, and more preferably from about 2 to about 4 microns, and most preferably less than 2 microns. It is difficult, however, to obtain accurate particle size distributions for graphite powders due to their platelike nature. In the particle size range of interest the specific surface area of the graphite particle is considered the more relevant characteristic in determining suitable material. Accordingly, suitable graphite particles are specified as having a specific surface area of at least about 5 square meters/gram, more preferably at least about 18 square meters/gram and most preferably at least 22 square meters/gram, but not exceeding 100 square meters/gram. The graphite powder should be at least of 95 percent purity and should not contain impurities as mentioned above with respect to the SiC powder which may interfer with sintering. Less desired are graphite materials containing carbon in other forms because these will result in a higher total carbon content for a given graphite content, thereby lowering the desirable properties of the resulting composite silicon carbide/graphite/carbon ceramic body that are derived from graphite.

C. Sintering Aid

Materials which promote self-diffusion of and/or form solid solutions with the silicon carbide powder at sintering temperatures are utilized as sintering aids. Materials suitable as sintering aids are selected from the group consisting of boron, aluminum, beryllium or compounds containing any one or more of these or a mixture of any of the foregoing elements or compounds in the immediate presence of amorphous carbon. Nitrides and carbides of aluminum, boron and beryllium, as well as compounds of these such as aluminum diboride, are particularly useful as sintering aids.

The amount of sintering aid to be employed is best considered in relationship to the amount of silicon carbide present. The amount of sintering aid expressed as a molar ratio of the amount of elemental aluminum, boron or beryllium present relative to silicon carbide powder should be from about 0.006 to about 0.20. These amounts of sintering aid when expressed in term of percent of the weight of the raw batch are from about 0.15 to about 15 percent by weight of the raw batch ingredients. Thus, sintering aid should be present in a quantity sufficient to provide from about 0.15 to about 5.0 percent by weight of silicon carbide of elemental aluminum, boron or beryllium and preferably from about 0.30 percent minimum. When the sintering aid is present in an amount sufficient to yield greater than about 3 percent of weight of elemental aluminum, boron or beryllium, no further advantage has been identified regarding densification of the silicon carbide matrix and the excess sintering aid may be present in the final product as a distinct crystalline phase. Conversely, when less than 0.15 percent by weight of elemental aluminum, boron or beryllium is provided based on the weight of silicon carbide present, the desired densification of the silicon carbide/graphite composite to at least 75 percent of theoretical does not reliably occur when sintering is conducted in the absence of externally applied pressure. The best results with regard to densification are obtained with boron carbide (B₄C) as a sintering aid in quantities that result in sintered articles having a content of from about 0.3 to 3.0 percent by weight of boron. When boron is used, the optimum level in the sintered article is believed to be about 0.5 weight percent (2 mole percent). When aluminum is used, the optimum level is believed to be about 1.0 percent.

It has not been found necessary to increase the amount of sintering to counteract absorption by the graphite powder or the carbon resulting from in situ coking of an organic material within a unsintered pre-shaped object.

Boron and boron carbide are a particularly preferred sintering aids. Of these boron carbide is most preferred due to its lower cost and greater availability. Boron carbide is essentially a non-stoichiometric material and various boron carbide materials having a molar ratio of boron to carbide between 8 to 1 and 2 to 1 have been reported. It is generally preferred to use boron carbide as the boron source and particularly a form of boron which is called "solid state reacted boron carbide" having a molar ratio of boron to carbon between about 3.5 to 1 and 4.1 to 1. Such a solid state reacted boron carbide can be produced in accordance with the process of U.S. Pat. No. 3,379,647 to P. A. Smudski. Boron carbides having a molar ratio of boron to carbide even greater than 4.1 to 1 are quite desirable but these materials are relatively less available and considerably more expensive and are, therefore, not preferred. The boron source can be crystalline or non-crystalline and preferably is particulate and of a size less than 30 microns. Within this limitation, it is preferred that the source be of a size ranging from about 0.1 to about 10 microns to facilitate forming a homogeneous mixture with the other component ingredients.

D. Carbon

As previously mentioned, carbon is also necessary to be present in an amorphous form in specified quantity at the commencement of sintering to yield highest densification. According to the present invention additional carbon beyond that necessary to effect highest densification is added to provide a pressureless-sintered silicon carbide/carbon composite body. When it is desired to provide a mixture which can be pressureless sintered to greater than 96 percent of theoretical density, it is present in an amount from about 1.0 up to about 5 percent by weight of the batch. This amorphous carbon is best provided by use of an organic-solvent soluble, organic material which can be coked at temperatures below about 1000° C. to form amorphous carbon. Particularly preferred materials are phenolic resins and coal tar pitch which have char yields of from about 40 to 60 percent, respectively, although any solvent soluble organic material, which can be coked to provide amorphous uncombined carbon having a carbon content of from about 25 to about 75 percent by weight is acceptable. From about 0.67 to about 17 percent by weight of such an organic solvent soluble organic material is employed in the raw batch from which the shaped object is formed. It is preferred that the organic material have a char yield of from about 33 to about 50 percent by weight and more particularly from about 40 to about 45 percent by weight. The most preferred amount of carbonizable organic material in the sintered composite ceramic body is believed to be that which will yield about 2 percent by weight carbon char and, thus, the optimum raw batch for preparation of the shaped object should contain about 5 percent by weight of an organic solvent soluble organic material having a char yield between about 40 and 45 percent by weight. Particularly useful are B-stage resole phenolic resins. Also useful, for example, are thermosetting resins, such as epoxy resins and phenol formaldehyde resins of the novolac type. A particularly good carbon source material is polyphenylene resin which provides a char yield up to 80 percent. Polyphenylene resins are available from Hercules, Incorporated, Wilmington, Del. Highly suitable resins are Plyophen TM 90-151, a phenol formaldehyde product available from Reichold Chemicals, Inc. White Plains, N.Y. and B178, a B-stage resole phenolic resin available from Varcum Chemical Company, Niagara Falls, N.Y. Sugar solutions, e.g. Karo ™ syrup may be used although they are not preferred due to low yield of carbon.

Thermoplastic resins are not generally useful as primary sources of amorphous carbon because of their relatively low char yields. Additionally, such materials volatilize at baking temperatures of the present invention and, as a result, contribute little, if any, of the required amorphous carbon.

The necessary amorphous carbon may be supplied, in whole or in part, to the mixture in the form of particulate carbon black, for example acetylene black, advantageously having a surface area of between about 10 and about 400 square meters/gram. The use of carbon black is, however, not preferred due to handling inconvenience and greater difficulty in forming a homogeneous sinterable powder mix. A solvent or temporary binder is helpful when forming sinterable powders using carbon black as the source of amorphous carbon.

These same resinous carbon source materials are used in impregnation of the shaped object.

E. Temporary Binder

The raw batch may contain optionally a temporary binder to facilitate forming and retention of green strength of a shaped green body from the raw batch which body is to be thereafter sintered. The temporary binder may be employed up to about 25 percent by weight of the batch. Suitable temporary binders include polyvinyl alcohol, coal tar pitch, long chain fatty materials, such as oleic acid, metallic stearates such as oleic acid, metallic stearates, polyolefins and mineral oils, sugars, starches, alginates and polymethyl phenylene. It is to be noted that the temporary binder, when present, may contribute to the quantity of carbon char (amorphous carbon) present in the raw batch and the total carbon necessary for sintering should be adjusted accordingly to maintain the limits herein set forth. It is also to be noted that a carbonizable resin, particularly a thermosetting one, may serve both as a carbon source and a temporary binder. An eminently suitable temporary binder is polyvinyl alcohol having associated therewith from about 5 to about 15 parts by weight of water per part of polyvinyl alcohol as a temporary binder vehicle. In particular, it is preferred to use about 10 parts by weight polyvinyl alcohol plus 90 parts by weight of water as a temporary binder vehicle.

2. Method of Making

A. Mixing of the raw batch (pressureless sinterable silicon carbide pre-mix)

The process for producing a sintered silicon carbide/carbon composite ceramic body according to the present invention is illustrated schematically in FIG. 1. The process preferably begins with mixing together the ingredients of the raw batch, namely from about 0.67 to about 17 percent by weight of organic material which can be coked to yield amorphous carbon; from about 0.15 to about 15 percent by weight of a sintering aid; and optionally up to 25 percent by weight of a temporary binder with the balance being silicon carbide powder and optionally from 1 to about 47 percent by weight graphite. Details of the formation of such pre-mix, with the exception of graphite, are disclosed in U.S. Pat. Nos. 4,179,299; 4,124,667; and 4,346,049. The amount of free silicon in the raw batch should not exceed about one percent. If a temporary binder, such as polyvinyl alcohol including a quantity of water is employed, the first mixing step preferably includes stirring the powdered materials (silicon carbide, graphite, organic material and sintering aid) together with the temporary binder and temporary binder vehicle prior to adding an organic solvent in which the organic material is soluble. In any event, after the organic solvent is added, the raw batch and organic solvent should be stirred in such a way as to disperse the organic solvent soluble, organic material which can be coked about the silicon carbide of the raw batch. This may be accomplished by stirring for at least about 5 minutes and preferably about 15 minutes. Alternatively, the ingredients may be dispersed by milling in a conventional ball mill or processing in a vibro-energy mill. Milling times up to 4 hours may have been employed without any negative effect on sintering (percent of theoretical density obtained). However, excessive milling may reduce the graphitic nature of the graphite and should be avoided. When an organic solvent soluble temporary binder is not employed, the mixing or milling may be conducted in the presence of an organic solvent such as acetone or heptane.

Following this mixing step, the mixture is dried in conventional manner by any suitable technique such as passing a quantity of drying gas, such as nitrogen, through or near the stirred mixture or by pan or spray drying of the mixture.

Following this drying step, the dried mixture is preferably screened so it will pass a 40 mesh and preferably a 60 to 80 mesh sieve (U.S. Standard).

When the carbon-containing additive or source is amorphous carbon, the mixing is preferably carried out in the presence of a temporary binder that is advantageously first dissolved in an organic solvent such as acetone or an aliphatic alcohol or alkane containing up to 7 carbon atoms.

The optional graphite powder may be added subsequent to the formation of a pre-mix which itself is formed by mixing together silicon carbide, amorphous carbon source, sintering aid, organic solvent and optionally temporary binder. The organic solvent is normally dried subsequent to formation of the pre-mix. The pre-mix is then broken up so it will pass a 40 mesh and preferably a 60–80 mesh U.S. standard sieve. If the pre-mix is not sufficiently broken up, upon shaping the resulting shaped body will not be sufficiently compacted and voids of excessive size will likely result. It is important that graphite, if used, be homogeneously distributed throughout the silicon carbide matrix. The optional graphite may be added prior to drying the pre-mix. When graphite is added to the previously dried pre-mix, an organic solvent may also be added to facilitate formation of a homogeneous mixture. The solvent is removed prior to shaping in the manner previously described.

Sintering aid can also be added by using pre-doped silicon carbide powder, pre-doped graphite powder, or by introduction into the resin which is to be charred to form amorphous carbon or into a plasticizer or temporary organic binder or a combination of any of these. Sintering aid can also be introduced in liquid form into the green body as in Canadian Pat. No. 1,139,791. Sintering aid can also be introduced by firing of the body being sintered within a graphite container that has been saturated with sintering aid by previous exposure to sintering aid at or about the temperature of sintering.

Sintering aid may also be introduced during sintering in the form of a gas. Combinations of these techniques may be employed.

The level of sintering aid is provided within the body being sintered may be maintained by assuring that the partial pressure of sintering aid in the sintering atmosphere is equal to or greater than that within the body being sintered. A practical way to accomplish this is to enclose the body being sintered within a sealed container which is impervious to the aluminum, boron or beryllium of the sintering aid at sintering temperature and which has a volume approximating the size of the body being sintered. Alternate ways of introducing and maintaining an effective amount of sintering aid are described in U.S. Pat. Nos. 4,172,109 and 4,080,415 now Reissue No. 30,386.

B. Shaping

Following the drying and sieving steps, the dried mixture is shaped in such a way as to produce a shaped object having interconnected micropores preferably having a density of at least about 45 percent of theoretical and preferably between about 50 and about 65 percent of theoretical. This shaping can be accomplished by any of a variety of techniques which are in themselves known, for example by extrusion, injection molding, transfer molding, casting, cold pressing, isostatic pressing or by die compression. When compression is used, suitable pressures are between about 8,000 and 25,000 psi and preferred pressures are between about 15,000 and 20,000 psi.

When a temporary binder is present, the temporary binder is preferably cured by heating the shaped object at an appropriate temperature below coking temperature for an appropriate time. This results in improved strength of the shaped object and thereby facilitates machining of the shaped object, if necessary, to attain the desired shape. For example, when the temporary binder is polyvinyl alcohol, it may be cured by heating the shaped object at a temperature of about 90° C. to about 150° C. for about 1 to about 2 hours. The shaped object may be easily machined, if desired, at this time.

C. Infiltrating

The shaped object is then infiltrated with an organic material such as those resins described hereinabove within subsection 1.D. which describes sources of amorphous carbon. Highly suitable resins are Plyophen TM resins which are phenol formaldehyde products and Resin B178, a B-stage resole phenolic resin. Infiltration may be accomplished by gradual immersion of the shaped object in the resin or resin solution or by gradual introduction of the infiltrant into a vessel containing the object to be infiltrated. Rapid complete immersion of the shaped object may result in disintegration due to rapid emergence of trapped air. The time required for complete infiltration by immersion at atmospheric pressure can be from one-half hour to a full day, depending upon viscosity of the infiltrant and cross-sectional thickness of the part to be infiltrated. Pressure or vacuum or a sequential application of these may be used to facilitate and accelerate complete infiltration of the resin or resin solution into the shaped object. Exposure of the shaped object to the infiltrating resin or resin solution is continued until the shaped object is completely saturated with the infiltrant. The amount of time for complete infiltration to be acomplished may be determined empirically as that time after which no further weight gain of the shaped object being infiltrated occurs. The amount of carbon to be added by infiltration of the shaped object is controlled by selection of the resin type (amount of char yield) and its concentration in a suitable solvent. Typically, the amount of resin or resin solution absorbed by the shaped object will yield carbon in an amount of from about 2 to about 25 percent.

After being infiltrated with a resin solution, the shaped object is dried to drive off the solvent used to carry the resin. When a pure resin is used as the infiltrant there exists no need to dry the infiltrated body and the infiltrated body may be taken directly to sintering, provided that slow heating rates, e.g. 100° C. per hour are employed to coking temperature of that resin. If fast heating rates are to be employed, i.e. greater than 100° C. per hour, it is advisable to cure the resin before entering the sintering cycle. Otherwise disintegration of the infiltrated object may occur due to rapid emission of gases upon decomposition of the infiltrant resin.

Additional infiltration cycles may be employed to increase the amount of carbon source material in the shaped object. When a resin solution is used as the infiltrant, a drying and curing step is preferably employed between each cycle to prevent or minimize extraction of that carbon source material previously deposited. Similarly, when a pure resin is employed as the infiltrant, if it is desired to maximize the amount of resin added, multiple cycles of infiltration with each being followed by a curing step may be employed. Curing may be accomplished by heating the infiltrated body to a temperature as recommended by the supplier of the resin but below that at which sintering of the infiltrated body occurs. Preferably the curing temperature employed is below that at which coking occurs although coking may be necessary in order to obtain highest levels of carbon addition. This curing temperature is typically of the order of 60°-500° C. For the preferred carbon source materials this curing is accomplished in air at 80°-150° C.

Another option is to partially sinter, then infiltrate the resulting shaped object which still contains interconnected micropores.

D. Sintering

The shaped body is then fired to accomplish the densification necessary to produce a sintered silicon carbide/carbon or silicon carbide/ graphite/carbon composite ceramic body according to the invention. Firing takes place from about 20 to about 180 minutes at temperatures of from about 1900° to about 2300° C. Lower temperatures are generally inoperable and higher temperatures cause sublimation of the silicon carbide material. The firing step can be carried out in a batch furnace or in a tube furnace wherein the shaped body is passed through the hot zone of the tube furnace to have a desired residence time at the desired temperature. Heating and cooling rates can vary widely depending upon furnace equipment and size and configuration of the parts to be sintered. The details of such a tube furnace are known in the prior art and are described, for example, in U.S. Pat. No. 3,689,220 to P. A. Smudski. Firing is carried on in the absence of any externally applied pressure, particularly mechanical pressure, save that which may occur due to the presence of a gas at a pressure up to about one atmosphere. Such a firing or sintering process is referred to as being "pressureless". During pressureless sintering, the object being sintered is surrounded, usually in an inert container such as a graphite crucible, in up to about one atmosphere of pressure of an inert gas, a reducing gas, a vacuum or nitrogen. Reducing gases include hydrogen and carbon monoxide. Inert gases include the rare gases such as argon, helium, and neon. The gases in which the sintering operation is preferably carried out thus include inert gases and nitrogen and mixtures of these. Reducing gases are not recommended for achieving high sintered densities because some reactions with sintering aids resulting in formation of volatile compounds have been observed. Nitrogen, when utilized, enters into reaction in a minor way with the silicon carbide raw material. The use of nitrogen raises the necessary temperature for sintering about 150° C. in comparison with processes utilizing inert gases such as argon, helium or neon. Nitrogen atmosphere is not recommended in combination with aluminum sintering aid because high density is not easily achieved. The firing can also be carried out under vacuum which, for purposes of this application, is defined as being 1 mm. of mercury or less.

A pressureless-sintered body is one in which the sintering process is effected in the absence of any externally applied pressure save that which may occur due to the presence of a gas at a pressure up to about one atmosphere.

The presence of a continuous phase of silicon carbide in composite bodies according to the invention is evidenced by a shrinkage in volume which occurs during initial firing of a preshaped object at sintering conditions. The amount of shrinkage decreases as the amount of carbon/graphite added increases. When a continuous silicon carbide phase is not formed, as for example, when too much graphite is present, such shrinkage does not occur upon firing at sintering conditions. The absence of a continuous silicon carbide phase will also be evidenced by a composite body having a very low resistance to rupture.

The resulting sintered composite body may exhibit some open porosity. The open porosity of the sintered composite body may be further reduced by infiltrating the sintered body with a carbon source resin and coking such resin in situ in a manner like that described hereinabove with respect to the shaped object. Extremely low open porosity can be obtained in this manner.

As used herein, "open porosity" means that which is determined by water saturation (ASTM C20-74).

Various aspects of the invention will now be illustrated with several examples.

TABLE I

| Sample No. | Raw Batch Carbon/Source (net wgt %) | Raw Batch Graphite (wgt %) | Infiltrant Carbon (net wgt %) | Sintering Aid (wgt %/Source) | Silicon Carbide (wgt %) | Sintering atm/Temp (°C.)/ time (hr)/FIG. No. | Reheating atm/Temp/ time (hr)/FIG. No. |
|---|---|---|---|---|---|---|---|
| 1 | 2/A | 0 | 0 | 0.5 (net B from B$_4$c) | 97.5 Grn | Ar/2150/.5/2 | Ar/2150/0.5/3 |
| 2 | 2/A | 3.0 | 0 | 0.5 (net B from B$_4$c) | 94.5 Grn | Ar/2150/.5/4 | Ar/2150/0.5/5 |
| 3 | 2/A | 4.5 | 0 | 0.5 (net B from B$_4$c) | 93.0 Grn | Ar/2150/.5/6 | Ar/2150/0.5/7 |
| 4 | 2/A | 8.0 | 0 | 0.5 (net B from B$_4$c) | 89.5 Grn | Ar/2150/.5/8 | Ar/2150/0.5/9 |
| 5 | 2/A | 5.0 | 0 | 0.5 (net B from B$_4$c) | 92.5 Grn | Ar/2150/.5/10 | |
| 6 | 2/A | 5.0 | 0 | 1.0 (net B from B$_4$c) | 92.0 Grn | Ar/2150/.5/11 | |
| 7 | 5/A | 0 | 0 | 0.5 (net B from B$_4$c) | 94.5 Grn | Ar/2150/.5/12 | |
| 8 | 10/B | 0 | 0 | 2.0 wgt % AlB$_2$ | 88.0 Grn | Ar/2150/.5/13 | |
| 9 | 2/A | 0 | 3.0 | 0.5 (net B from B$_4$C) | 94.5 Grn | Ar/2150/.5/ | |
| 10 | 2/A | 0 | 4.0 | 0.5 (net B from B$_4$C) | 93.5 Grn | Ar/2150/.5/ | |
| 11 | 2/A | 0 | 9 | 0.5 (net B from B$_4$C) | 90.5 Grn | Ar/2150/.5/ | |
| 12 | 2/A | 0 | 5 | 0.5 (net B from B$_4$C) | 94.5 Grn | Ar/2150/.5/ | |
| 13 | 2/A | 0 | 0 | 0.5 (net B from B$_4$C) | 97.5 Blk | N$_2$/2250/.5/ | |
| 14 | 2/A | 0 | 7 | 0.5 (net B from B$_4$C) | 92.5 Blk | N$_2$/2250/.5/ | |
| 15 | 2/A | 0 | 7 | 0.5 (net B from B$_4$C) | 92.5 Grn | N$_2$/2250/.5/ | |
| 16 | 2/A | 0 | 0 | 0.5 (net B from B$_4$C) | 97.5 Grn | N$_2$/2250/.5/ | |
| 17 | 2/A | 0 | 1.5 | 0.5 (net B from B$_4$C) | 98.0 Grn | Ar/2150/.5/14 | Ar/2150/.5/15 |
| 18 | 2/A | 0 | 3.4 | 0.5 (net B from B$_4$C) | 96.1 Grn | Ar/2150/.5/16 | Ar/2150/.5/17 |
| 19 | 2/A | 0 | 5.2 | 0.5 (net B from B$_4$C) | 94.3 Grn | Ar/2150/.5/18 | Ar/2150/.5/19 |
| 20 | 2/A | 0 | 5.6 | 0.5 (net B from B$_4$C) | 93.9 Grn | Ar/2150/.5/20 | Ar/2150/.5/21 |
| 21 | 2/A | 3.0 | 3.0 | 0.5 (net B from B$_4$C) | 91.5 Grn | Ar/2150/.5/22 | Ar/2150/.5/23 |
| 22 | 2/A | 0 | 0 | 0.5 (net B from B$_4$C) | 97.5 Grn | Ar/2150/0.5 | |
| 23 | 2/A | 0 | 2.0 | 0.5 (net B from B$_4$C) | 95.5 Grn | Ar/2150/0.5 | |
| 24 | 2/A | 0 | 4.0 | 0.5 (net B from B$_4$C) | 93.5 Grn | Ar/2150/0.5 | |

A = Plyophen 90-151
B = B 178

TABLE II

| Sample No. | Density (g/cc)/% of Theoretical | Fracture Toughness (MPa · m$^{\frac{1}{2}}$) | Sonic Modulus (10$^6$ psi) | Specific Electrical Resistivity (Ohm · cm) | MOR (10$^3$ psi) | Open Porosity (%) | Open Pore Radius (microns) | Microstructure Av Gr Size (microns)/ Avg Aspect ratio | | Electrical Discharge Machinability |
|---|---|---|---|---|---|---|---|---|---|---|
| | | | | | | | | Orig | Reheat | |
| 1 | 3.174/98.9 | 3.07 | 53.3 | 20.7 | 39.5 | 0 | not detected | 4.0/2.1 | 4.0/2.0 | unworkable |
| 2 | 3.074/97.0 | 3.46 | 50.9 | 77.5 | 39.4 | 1.23 | not detected | 2.7/2.3 | 3.2/1.4 | — |
| 3 | 3.001/97.0 | 4.23 | 47.8 | 2.94 | 46.3 | 0.81 | not detected | 2.4/1.8 | 2.4/1.9 | — |
| 4 | 2.793/90.0 | 4.18 | 36.9 | 0.0485 | 28.2 | 8.6 | 0.025–0.075 | 2.7/— | 2.6/1.7 | — |
| 5 | 3.030/96.5 | 4.79 | 48.3 | 1.51 | — | 0.05 | — | 2.7/1.9 | — | poor* |
| 6 | 3.030/96.4 | 3.57 | 49.4 | 1.73 | — | 1.18 | — | 3.0/1.8 | — | fair |
| 7 | 3.053/95.1 | 3.07 | 57.5 | 16.94 | — | 0.05 | — | 4.2/2.2 | — | — |
| 8 | 2.953/95.7 | 3.87 | 45.4 | 0.60 | — | 0.20 | — | 4.3/3.1 | — | good |
| 9 | 3.117/98.9 | | | 10.2 | | 0 | not detected | | | |
| 10 | 3.087/98.3 | | | 12.0 | | 0 | not detected | | | |
| 11 | | | | 0.0658 | | | | | | very good |
| 12 | | | | 5.44 | | | | | | |
| 13 | 3.178/98.8 | | | 3.74 × 10$^6$ | | 0 | | | | |

TABLE II-continued

| Sample No. | Density (g/cc)/% of Theoretical | Fracture Toughness (MPa · m$^{\frac{1}{2}}$) | Sonic Modulus (10$^6$ psi) | Specific Electrical Resistivity (Ohm · cm) | MOR (10$^3$ psi) | Open Porosity (%) | Open Pore Radius (microns) | Microstructure Av Gr Size (microns)/ Avg Aspect ratio Orig | Microstructure Av Gr Size (microns)/ Avg Aspect ratio Reheat | Electrical Discharge Machinability |
|---|---|---|---|---|---|---|---|---|---|---|
| 14 | 3.043/94.6 | | | 4.34 | | 0 | | | | |
| 15 | 2.994/93.1 | | | 1.96 | | 0 | | | | |
| 16 | 3.170/98.5 | | | 3.3 × 10$^6$ | | 0 | | | | |
| 17 | 3.126/97.4 | | | | | 0 | | 3.1/1.9 | 3.1/2.0 | |
| 18 | 3.089/96/2 | | | | | 0 | | 2.6/1.7 | 3.0/2.0 | |
| 19 | 3.046/94.9 | | | | | 0 | | 2.3/1.6 | 2.5/1.8 | |
| 20 | 3.027/94.3 | | | | | 0 | | 2.1/1.6 | 2.5/1.6 | |
| 21 | 3.062/97.6 | | | 1.89 | | 0.04 | | 2.7/2.0 | 3.0/2.1 | |
| 22 | | | | | 39.47 | | | | | |
| 23 | | | | | 45.74 | | | | | |
| 24 | | | | | 45.03 | | | | | |

*Unexpected in view of sample 6.

EXAMPLES 1-20

Silicon carbide powder having a specific surface area of 8-12 square meters/gram, a sintering aid as indicated in Table I, and Plyophen 90-151 phenol-formaldehyde resin (resin A) available from Reichold Chemicals Inc. or Varcum 8121 Resin (resin B) available from Varcum Chemical Company, Niagara Falls, N.Y., a division of Reichold Chemicals Inc., and one and a half weight percent polyvinyl alcohol were thoroughly mixed together, e.g. by milling in a ball mill having a plastic lined vessel containing silicon carbide grinding media in acetone or heptane. Upon completion of the mixing and drying cycle the mixture was such that it would pass through an 80 mesh U.S. Standard Sieve. At the end of the drying step there was only a faint trace of solvent smell and the material was dry to the touch. A portion of the dry raw batch powder was compressed at 14,000-16,000 psi to achieve a green density above 50 percent. After pressing into a microporous shaped object, the shaped object was cured at about 80° C. for 2 or more hours. Thereafter, the shaped object was placed into a vessel and an infiltrant solution gradually introduced. The infiltrant was either pure resin or a solution in water of Plyophen ™ 90-151 phenol-formaldehyde resin available from Reichold Chemicals Inc. The concentration of the solution was varied to control the amount of resin infiltrated. The calculated amount of carbon induced by the infiltrant is indicated in Table I. After completion of the infiltration step, the infiltrated object was dried and cured at 100 or more degrees centigrade. The infiltrated object was thereafter placed on a graphite setter tile. The infiltrated object was fed into a previously used tube furnace having a hot zone maintained at the temperature indicated in Table I below at a rate of about ¼ to ½ inches per minute so that the required time to traverse the hot zone of the furnace was as given in Table I. The sintering atmosphere, whether an inert gas at the pressure specified or in a vacuum, was as indicated in Table I. After sintering, the densified body was held for about 20 minutes in a cooling chamber to avoid thermal shock. After the sintered body had cooled, its physical and mechanical properties were observed to be as indicated in Table II.

Samples 1 through 8 were prepared in substantially identical manner and show the effect of varying the type and amount of various ingredients. Samples 9 through 21 were prepared in a manner similar to that of samples 1 through 8 except that a spray-dried mixture of silicon carbide powder, Plyophen ™ resin, B$_4$C sintering aid, 1½ percent PVA and 1½ percent polyethylene glycol were employed to form a microporous shaped object that was subsequently infiltrated with carbon source resin. Infiltration was accomplished by immersion of the shaped object(s) for each sample in pure resin or a solution of resin at atmospheric pressure, depending on the amount of carbon desired to be added by infiltration. Sintering conditions were as nearly identical as possible to achieve with presently available equipment which consisted of an electrical resistance heated tube furnace as described in U.S. Pat. No. 3,689,220. The sintering times given throughout are approximations as there can be no exact time given for the type of furnace employed because the hot zone and its boundary regions are a continuum.

Figure 3:
FIGS. 3, 5, 7, 9, 15, 17, 19, 21 and 23 show at a magnification of about 500 times, microstructure of compositions as given in Table I resulting from sintering in a tube furnace at 2150° C. for 30 minutes in argon followed by cooling to ambient and subsequently repeating this cycle.
Figure 4:
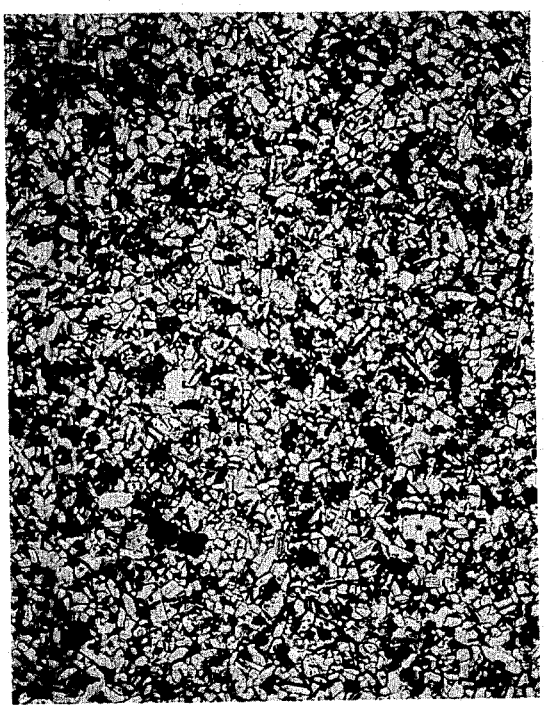
Figure 5:
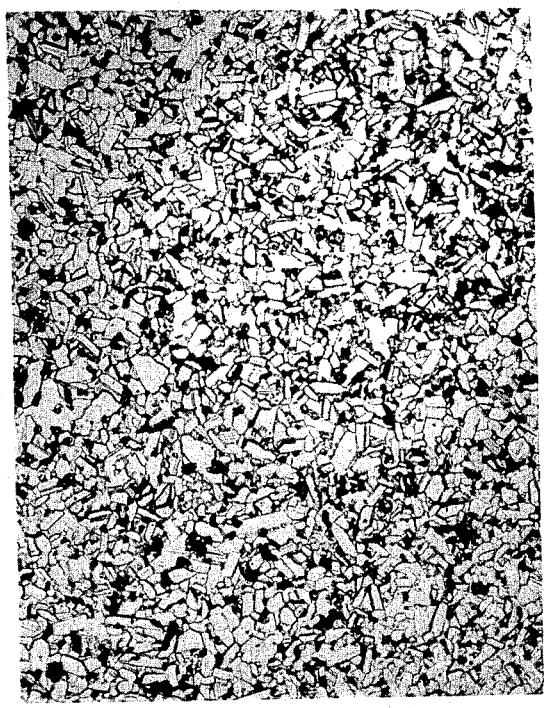
Figure 6:
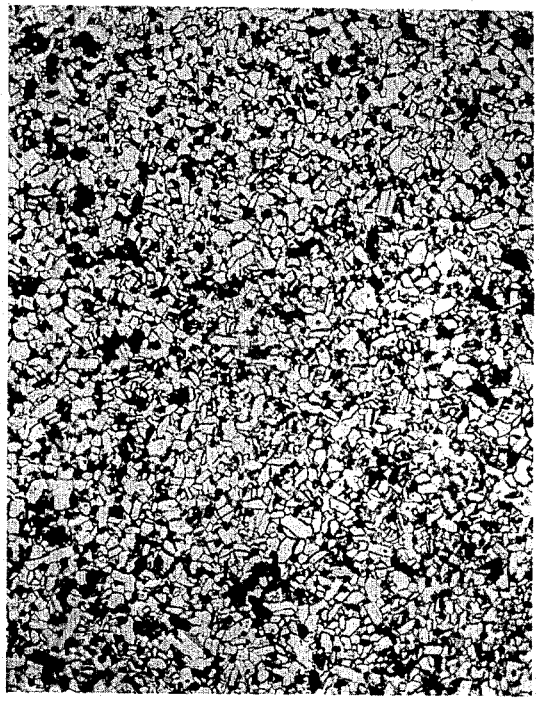
Figure 7:
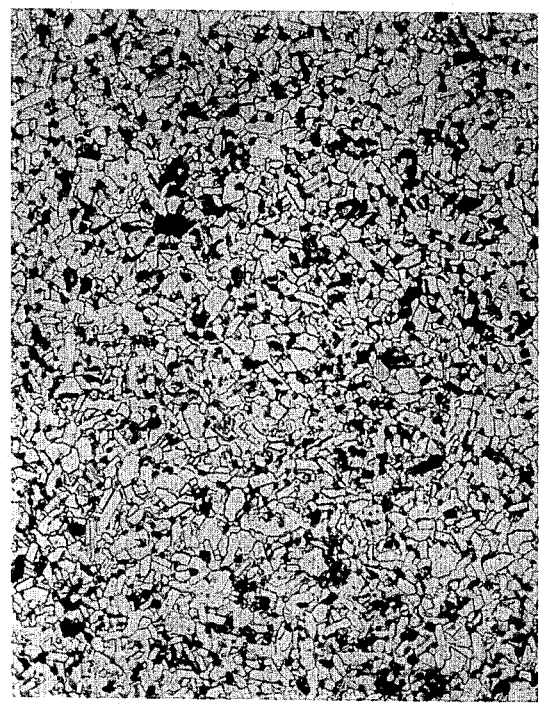
Figure 8:
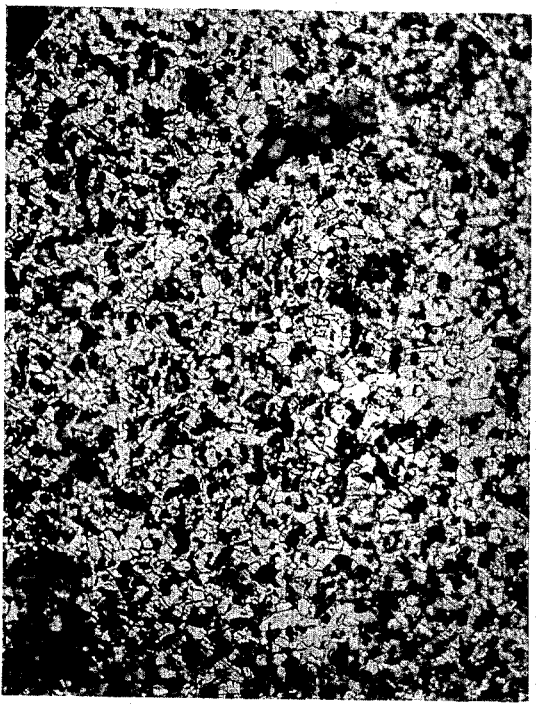
Figure 9:
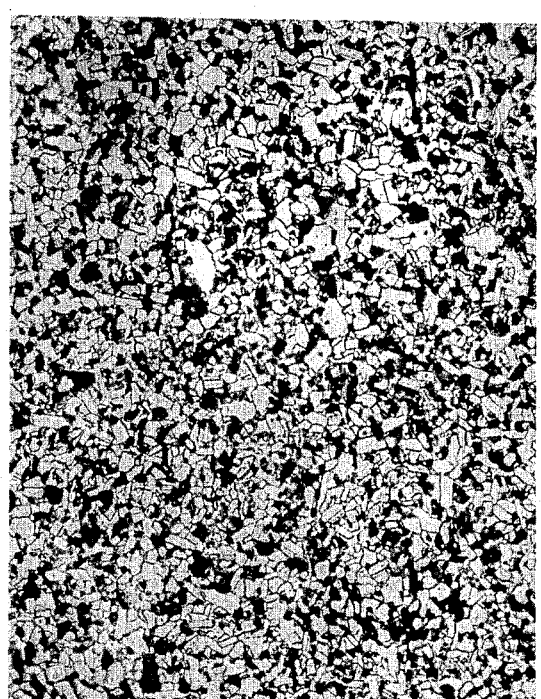
Figure 10:
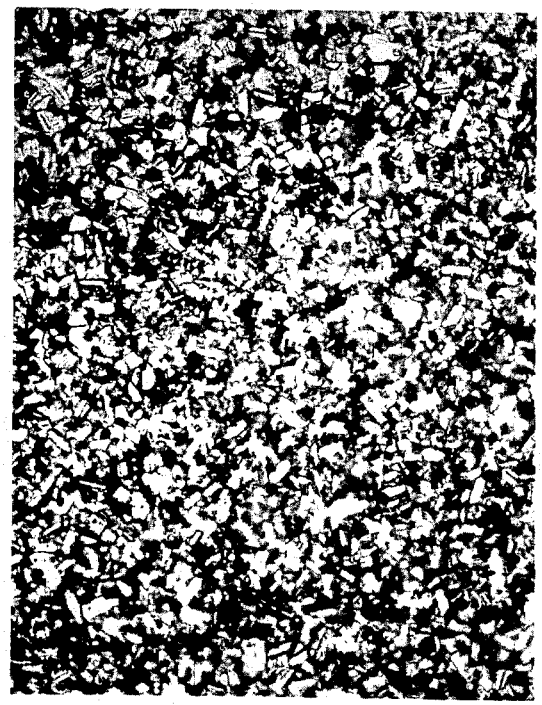
Figure 11:
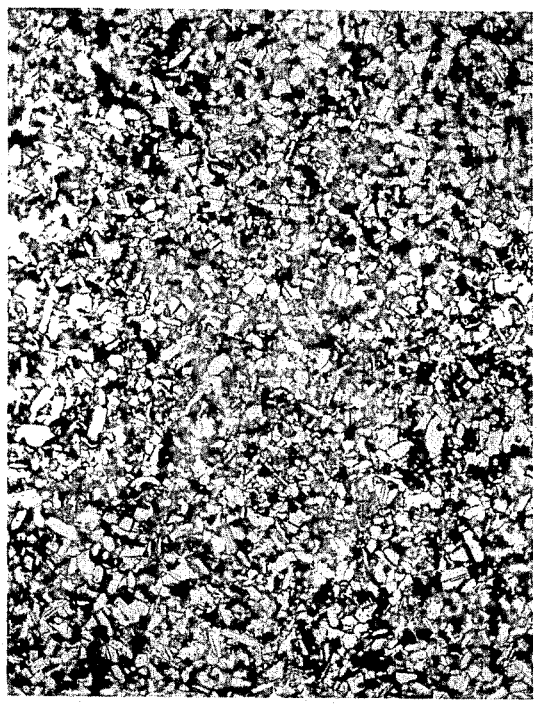
Figure 12:
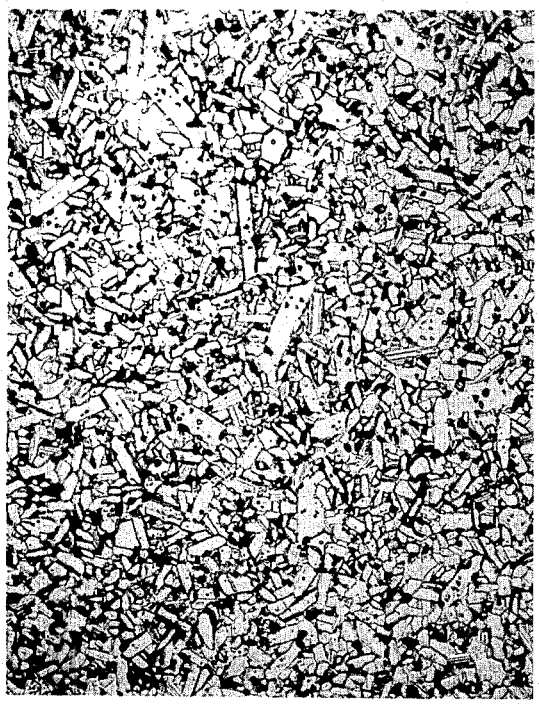
Figure 13:
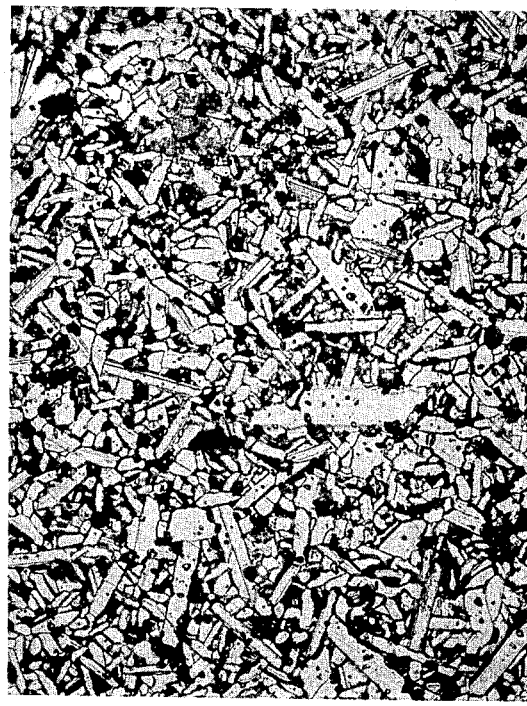
Figure 14:
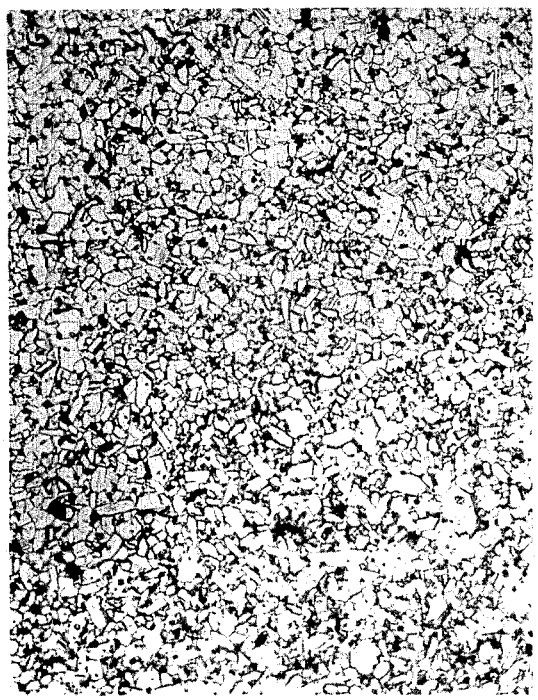
Figure 15:
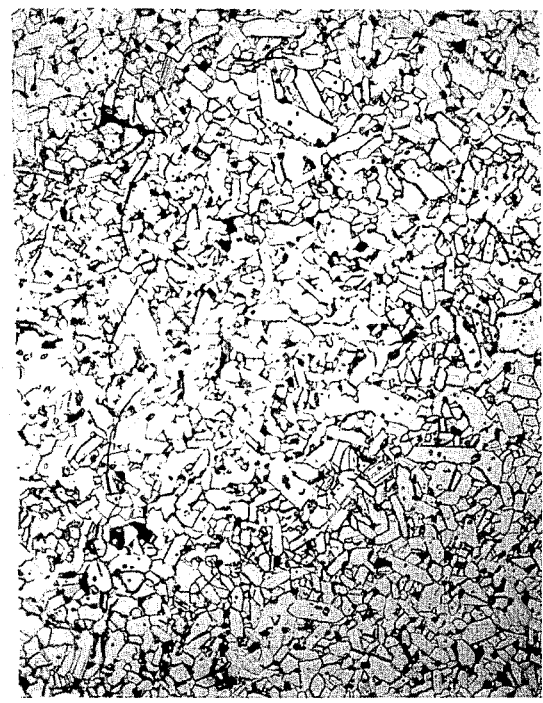
Figure 16:
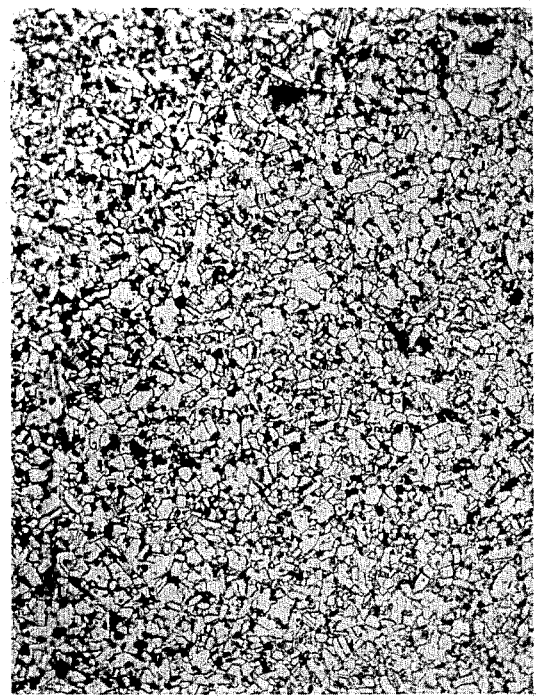
Figure 17:
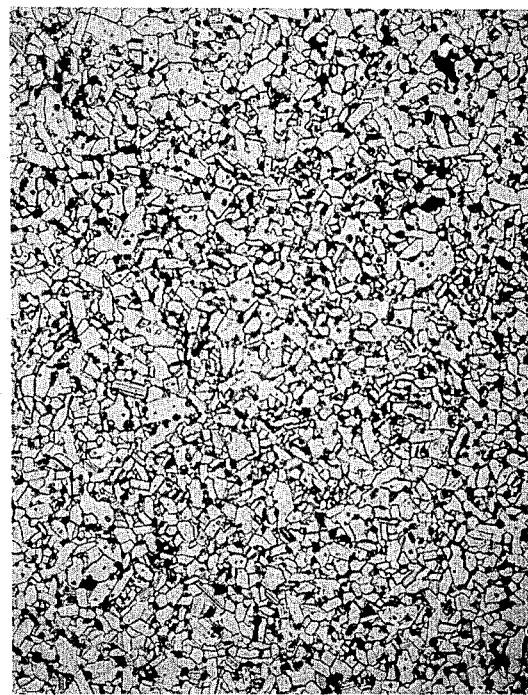
Figure 18:
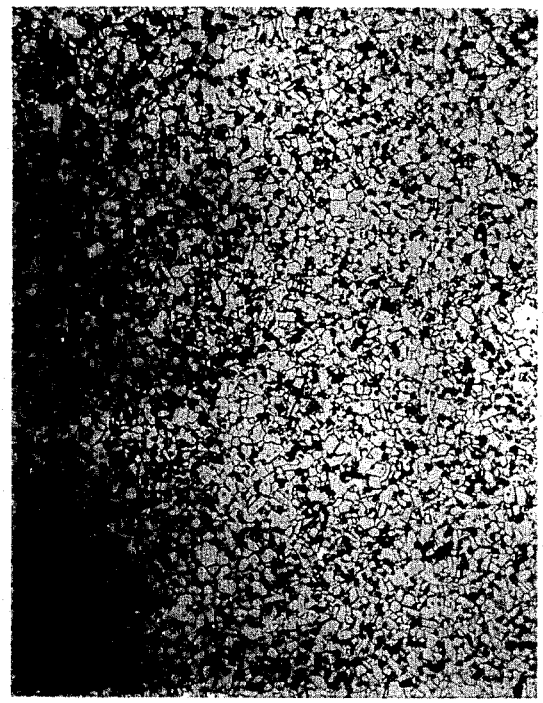
Figure 19:
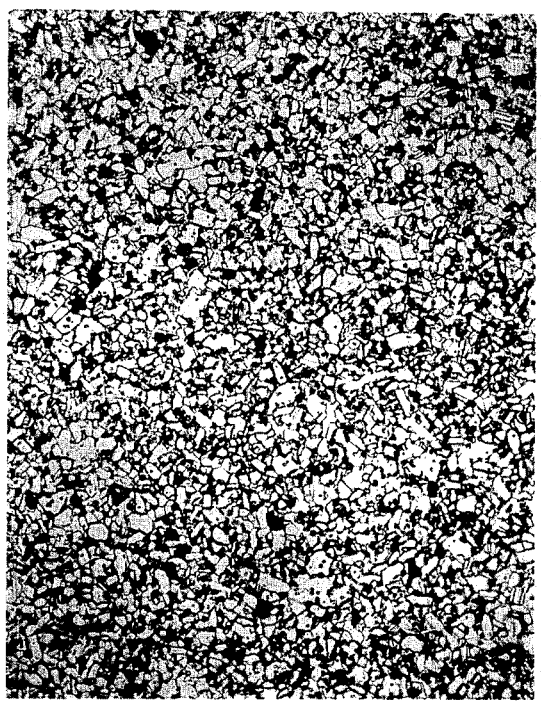
Figure 20:
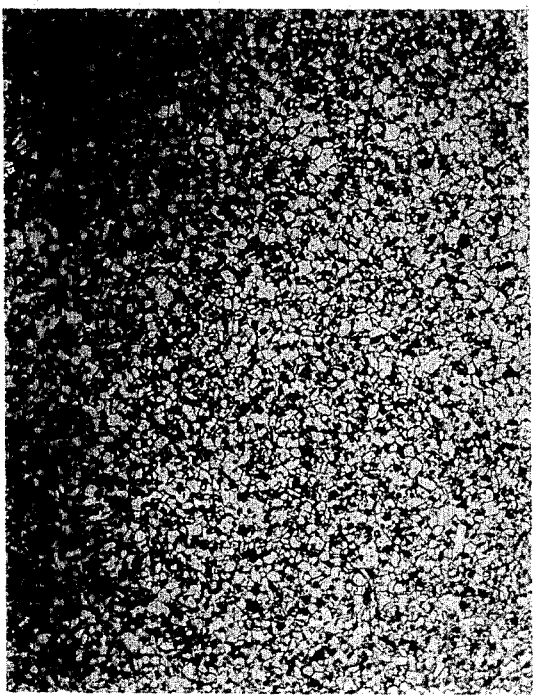
Figure 21:
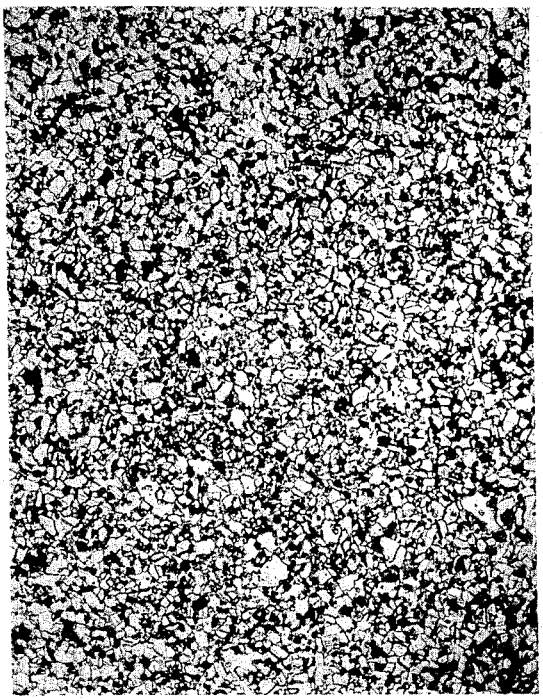
Figure 22:
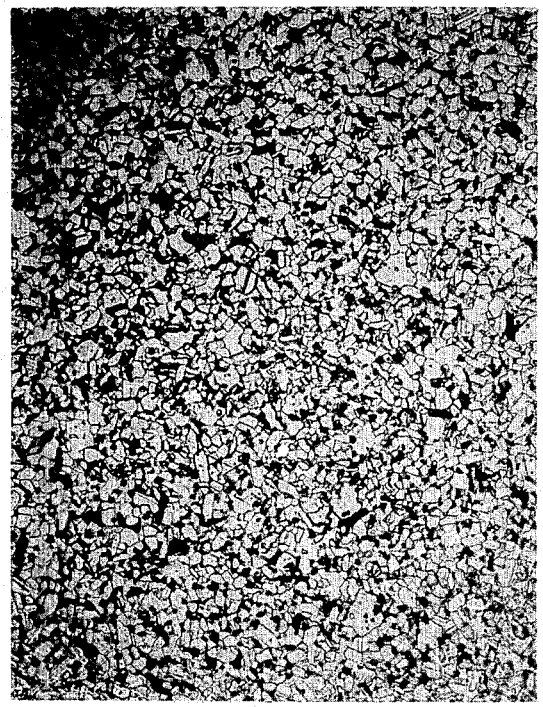
Figure 23:
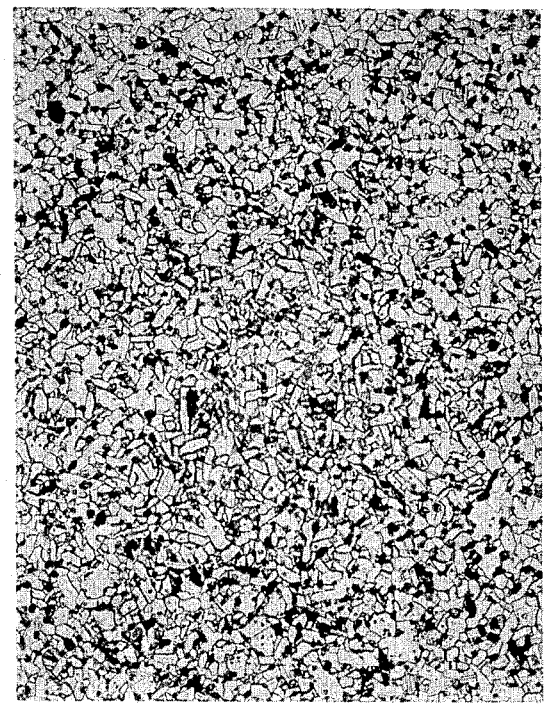

Samples 1 and 9 through 20 demonstrate the influence of various amounts of carbon added by infiltration of the microporous shaped body while maintaining constant the amount and type of amorphous carbon source resin and the amount and type of sintering aid in the shaped object being infiltrated. When the microstructures of samples 1 and 17 through 20 as shown in FIGS. 2, 14, 16, 18, 20 are compared with one another, it is seen that those samples containing infiltrant carbon exhibit a finer microstructure. Also, when Samples 17 through 20 as shown in FIGS. 15, 17, 19, 21 are compared to sample 1 as shown in FIG. 3 after reheating by passing them a second time through the sintering cycle, it is observed that less grain growth occurs in those samples containing carbon added by infiltration.

Samples 2, 3, 5, 7, 9, 10, 12, 18, 19 and 21 demonstrate the influence of varying the amount of carbon source resin, graphite or other carbon source in the shaped object while maintaining total carbon content at between about five and about eight percent respectively and at constant sintering aid type and amount. As shown in the photomicrographs corresponding to these samples as identified in Table I, respectively, and in Table II the grain size and aspect ratio of samples 2, 3, 5, 7 was not greatly influenced at these low total carbon levels; however, the inclusion of infiltrant carbon in each instance lowered the average grain size and electrical resistance. As shown by sample 20, infiltration with pure resin resulted in an even higher total uncombined carbon content than in samples 17 through 19 and an even finer polycrystalline microstructure.

Comparison of samples 2 and 18, both of which contain a total carbon content of about 5 percent, indicates that carbon addition by infiltration results in a finer, more uniform microstructure than addition of a comparable amount of graphite powder. This observation is confirmed by comparison of samples 5 and 19, both of which contain a total carbon content of about 7 percent.

The infiltrated samples exhibit lower open porosity at the same total carbon content.

Specific electrical resistivity of samples 1 through 16 and 21 was measured on bars of the same size and configuration ($2 \times \frac{1}{4} \times \frac{1}{8}$ inches). The data provided in Table II was obtained using a two point test method. The results given in Table II indicate that when a certain carbon level is reached, additional carbon greatly influences the resistivity of the sintered product. In this regard, compare samples 9, 10 and 14, 15 with 11, and 1, 2, 3, and 5 with 4. It is unexpected that relatively small increases in the amount of carbon could effect large decreases in electrical resistivity and that the relationship is clearly non-linear.

The specific electrical resistivity of a silicon carbide/carbon composite body is influenced by the total carbon level, the manner and type of carbon addition, the amount and type of sintering aid and the sintering atmosphere. Samples of similar composition sintered in nitrogen exhibit much higher resistivity than those sintered in argon, as demonstrated by comparison of results for samples 1 and 13 and samples 5 and 14. Comparison of samples 13 and 16 indicates that the type of silicon carbide powder has a minor influence. This is reinforced by comparison of samples 14 and 15. In each instance, the use of green color silicon carbide exhibited somewhat lower electrical resistivity than use of black color silicon carbide. Black color silicon carbide normally contains from about 0.1 to about 0.5 percent aluminum in solid solution as an impurity; green color silicon carbide contains no or very little aluminum.

Attempts were made to electrical-discharge machine samples 1, 5, 6, 8 and 11. The results are reported in Table II. The comparative performance of samples 1 and 11 establishes that infiltrant carbon aids in rendering sintered silicon carbide/carbon composites electrical-discharge machineable as well as providing composites having a very fine grain microstructure.

Fracture toughness and sonic modulus were tested on pressureless sintered discs of varying composition as shown in Table III.

TABLE III

| Sample No. | Infiltrant Carbon (Net wgt %) | Density (g/cc) | Fracture Toughness (MPa · m$^{\frac{1}{2}}$) | Sonic Modulus (10$^6$ psi) |
| --- | --- | --- | --- | --- |
| 25 | 0 | 3.174 | 3.77 | 59.4 |
| 26 | 1 | 3.160 | 3.91 | 58.6 |
| 27 | 2 | 3.147 | 4.17 | 58.3 |
| 28 | 3 | 3.135 | 4.50 | 57.8 |
| 29 | 4 | 3.128 | 4.71 | 55.6 |

Sample 25 is of a composition comparable to sample 1, Table II; samples 26-29 are according to the invention. All discs used in obtaining this data were made from a raw batch composition like that used to make sample 1 of Tables I and II. After shaping, the discs were infiltrated with varying concentrations of Resin A, as identified in Table I, cured and sintered. The results obtained indicate, as infiltrated carbon level increases from 0 to 4 percent, that sonic modulus decreases and fracture toughness increases as the infiltrated carbon level increases. Fracture toughness was measured using Vickers apparatus, a load of 5.0 Kg, an impact velocity of 0.3 mm/second and an acting period of 15 seconds.

Sonic modulus decreases with increasing graphite amount as indicated upon comparison of samples 1-6, Table II. Fracture toughness increases upon the addition of graphite as shown in samples 1-6, Table II.

"Grain size," as the term is used herein, means the maximum length straight line that can be contained within the borders of a grain as it appears on a plane surface of a polished specimen or a photomicrograph of such a specimen (area basis).

"Area basis," as the term is used herein, means as it appears or is derived from a plane surface of a polished specimen or a photomicrograph of such a specimen.

"Average grain size," as the term is used herein, means the arithmetic mean grain size of those grains observed on microscopic examination of a photomicrograph of a polished specimen of interest. Average grain size as reported in Table II was determined by the following linear intercept procedure.

A standard of known length is placed on a photomicrograph of the sample. The number of grains intercepted by the reference edge of the standard is determined. The length of the standard is divided by the number of grains. This quotient is then divided by the magnification to yield directly the average grain size in microns. A plurality of lines are used and averaged to neutralize any directionality.

"Aspect ratio," as the term is used herein, means the ratio of the maximum lineal dimension of a grain of the crystal microstructure to the minimum lineal dimension of a grain of the crystal microstructure on an area basis. A spherical grain would have an aspect ratio of 1. The product of the present invention is characterized in part by its silicon carbide matrix being formed on an area basis predominantly of grains that have an aspect ratio of less than about 3.

"Average aspect ratio" as reported in Table II was determined by dividing the photomicrograph format into an eight by ten matrix of equally-sized squares. Random numbers were then generated for these squares and employed to choose five squares. A template of the size of the photomicrographs was provided with this matrix. For each chosen square, a circle of the maximum size capable of fitting within one square was cut resulting in a template having five equal-sized randomly chosen holes. The template was placed on each photomicrograph and each of the exposed areas examined under magnification. For each of the five circles, the worst (largest and highest aspect ratio) grain which extended into or was contained within was singled out and its aspect ratio determined. For each of the five circles, a typical grain exclusive of the worst grain was selected and its aspect ratio determined. The results reported in Table 11 represent the average of the five worst grains and five typical grains selected for each sample's photomicrograph. Thus, the values given are weighted toward the worst grain for each sample. "Average aspect ratio" is not to be confused with or substituted for "aspect ratio" in interpreting the following claims.

Modulus of Rupture (MOR) was determined using a four-point bending technique employing a long span of 1½ inches and a short span of ½ inch (ASTM C651-70). The test bars were of $2 \times \frac{1}{4} \times \frac{1}{8}$ inches size.

We claim:

1. A process for producing a sintered silicon carbide/carbon composite ceramic body consisting essentially of:
    a. forming a homogeneous mixture comprising the components of:
        (1) a carbon-containing additive selected from the group consisting of amorphous carbon, and a solvent soluble, organic material which can be coked at temperatures below about 1000° C. to form amorphous carbon or mixtures thereof, in an amount between 0.5 and 5 percent by weight of uncombined carbon;

(2) from about 0.15 to about 15 percent by weight of a sintering aid selected from the group consisting of aluminum, beryllium or boron or compounds containing any one or more of these elements or a mixture of any of the foregoing elements or compounds, said sintering aid containing from about 0.15 to about 5 percent by weight of aluminum, boron or beryllium or a mixture of any of these elements;

(3) up to about 25 percent by weight of organic temporary binder;

(4) a balance of silicon carbide powder having a surface area of from about 5 to about 100 square meters per gram;

b. shaping the mixture in such a way as to produce a microporous shaped object having a density of at least about 45 percent of theoretical; and c. infiltrating the shaped object with a sufficient amount of an organic material which can be coked at temperatures below sintering temperature to form amorphous carbon, in an amount between about 1 and 25 percent by weight of the shaped object;

d. firing the infiltrated object in the absence of any substantial externally applied pressure under such conditions of time and temperature in an atmosphere inert to silicon carbide or in a vacuum at a temperature of between about 1900° C. and 2300° C. until a sintered body having a homogeneous microstructure of silicon grains having a maximum size of about 5 microns, said microstructure having carbon substantially uniformly dispersed throughout, is formed.

2. A process according to claim 1 wherein from about 0.5 to about 17 percent by weight of a solvent-soluble, organic material which can be coked and has a carbon content of from about 25 to about 75 percent by weight of the organic material is employed in forming the homogeneous mixture which further includes from about 25 to about 100 percent of the combined weight of the silicon carbide powder, graphite powder, organic material which can be coked, sintering aid and temporary binder, of a solvent in which the organic material which can be coked is soluble; said mixing being done in such a way as to disperse the organic material which can be coked about the silicon carbide powder and graphite powder and to coat the silicon carbide powder and graphite powder therewith, and drying the mixture in such a way as to evaporate the solvent therefrom prior to shaping.

3. A process according to claim 1 wherein the silicon carbide of the raw batch is predominately alpha, non-cubic crystalline silicon carbide.

4. A process according to claim 1 wherein the silicon carbide of the sintered composite body is predominately alpha, non-cubic crystalline silicon carbide.

5. A process according to claim 1 wherein the body is fired for a time varying from about 10 to about 180 minutes; wherein the temperature is between about 1900° C. and 2300° C.; and said conditions of atmosphere are firing in a vacuum or up to about one atmosphere of pressure of a gas selected from the group consisting of nitrogen, argon, helium, neon and mixtures thereof.

6. A process according to claim 1 in the level of sintering aid provided in the object being sintered is maintained by enclosing the object being sintered within a sealed container which is impervious to the aluminum, boron or beryllium of the sintering aid at the sintering temperature and which has a volume approximating the size of the object being sintered.

7. A process according to claim 1 wherein the level of aluminum, boron or beryllium to be derived from the sintering aid and retained in the object being sintered is maintained by containing the object being sintered within a graphite container, which container has been saturated with the sintering aid or elemental aluminum, beryllium or boron by previous exposure to the sintering aid or aluminum, beryllium or boron at or about the temperature of sintering.

8. A process according to claim 1 comprising the steps of:

a. forming a homogeneous mixture by mixing together the components of
(1) from about 91 to about 99.35 parts by weight silicon carbide having a surface area of from about 5 to about 100 square meters/gram;
(2) from about 0.67 to about 17 parts by weight of organic material which can be coked at temperatures below about 1000° C. to provide amorphous carbon and having a carbon yield of from about 25 to about 75 percent by weight;
(3) from about 0.15 to about 15 percent by weight of a sintering aid selected from the group consisting of any one or more of these elements or a mixture of any of the foregoing elements or compounds, said sintering aid containing from about 0.15 to about 5 parts by weight of aluminum, beryllium or boron or a mixture of any of these elements;
(4) temporary binder in amount up to 25 percent by total combined weight of the silicon carbide powder, organic material which can be coked and sintering aid; and
(5) from about 24 to about 100 percent by total weight of the silicon carbide powder, organic material which can be coked, sintering aid and temporary binder of a solvent in which the organic material is soluble; said mixing being done in such a way as to disperse the organic material about the silicon carbide powder and coat the silicon carbide powder therewith;

b. drying the mixture in such a way as to evaporate the solvent from the mixture;

c. breaking up the dried mixture so that it will pass an 40 mesh sieve;

d. adding graphite powder having an average particle size not in excess of 8 microns and a surface area of at least 5 square meters per gram to the mixture in an amount sufficient to bring the percent by weight of graphite in the resulting mixture in the range of from about 1 to about 48 percent and mixing the graphite powder and the mixture in such a way to disperse the graphite powder substantially homogeneously throughout the resulting graphite-containing mixture; and e. shaping the graphite-containing mixture in such a way as to produce a microporous shaped object having a density of at least about 50 percent of theoretical.

9. A process for producing sintered silicon carbide/carbon composite ceramic body according to claim 8 wherein the pre-mix comprises from about 0.3 to about 5 parts by weight of $B_xC$ wherein "$x$" is from 2 to 8, said $B_xC$ containing from about 0.3 to about 3.0 percent by weight boron.

10. A process according to claim 1 wherein forming a homogeneous mixture referred to in step a. comprises:
   a. dissolving an organic material which can be coked in a solvent; and
   b. mixing the solution so formed with the remaining components, and drying to the mixture prior to shaping.

11. A process according to claim 1 wherein the temporary binder is used in an amount of from about 1.5 to 5 percent.

12. A process according to claim 8 wherein the temporary binder is curable; and comprising a step of curing the temporary binder after shaping of the dried mixture but prior to firing of the shaped object.

13. A process according to claim 1 wherein the shaped object is infiltrated with a phenol-formaldehyde resin and the infiltrated object is thereafter heated to a temperature of about 90° C. to about 150° C. for about 1 to about 2 hours to cure the resin infiltrant.

14. A process according to claim 8 wherein the shaped body is fired for from about 20 to about 180 minutes at a temperature of from about 2100° C. to about 2300° C. and in up to about one atmosphere of pressure of a gas selected from the group consisting of argon, helium, neon, nitrogen and mixtures thereof.

15. A process according to claim 14 wherein the gas is approximately one atmosphere of the member selected from the group consisting of argon, helium and neon and the temperature is from about 2050° to about 2200° C.

16. A process according to claim 8 wherein the silicon carbide comprises predominately alpha, non-cubic crystalline silicon carbide.

17. A process according to claim 1 wherein the shaped object is infiltrated with an aqueous solution containing from 25 to 100 percent by weight of a phenol-formaldehyde resin having a char yield of about 40 percent by weight.

18. A process according to claim 1 wherein the resin that has been infiltrated into the shaped object is cured and subsequently the infiltration cycle is repeated.

19. A process according to claim 1 wherein the sintered composite body is infiltrated with a carbon source resin and subsequently reheated to coke the resin in situ.

* * * * *

UNITED STATES PATENT AND TRADEMARK OFFICE
CERTIFICATE OF CORRECTION

PATENT NO. : 4,692,418

DATED : September 8, 1987

INVENTOR(S) : Wolfgang D.G. Boecker and George I. Reini

It is certified that error appears in the above-identified patent and that said Letters Patent is hereby corrected as shown below:

In claim 1, column 21, line 34, "--silicon--" should read --silicon carbide--.

Signed and Sealed this

Fifth Day of February, 1991

Attest:

HARRY F. MANBECK, JR.

*Attesting Officer*   *Commissioner of Patents and Trademarks*